Oct. 25, 1927.
I. ISAACHSEN
1,646,454
METHOD OF SEPARATING TWO OR MORE SUBSTANCES FROM A SOLUTION
Filed Feb. 26, 1923
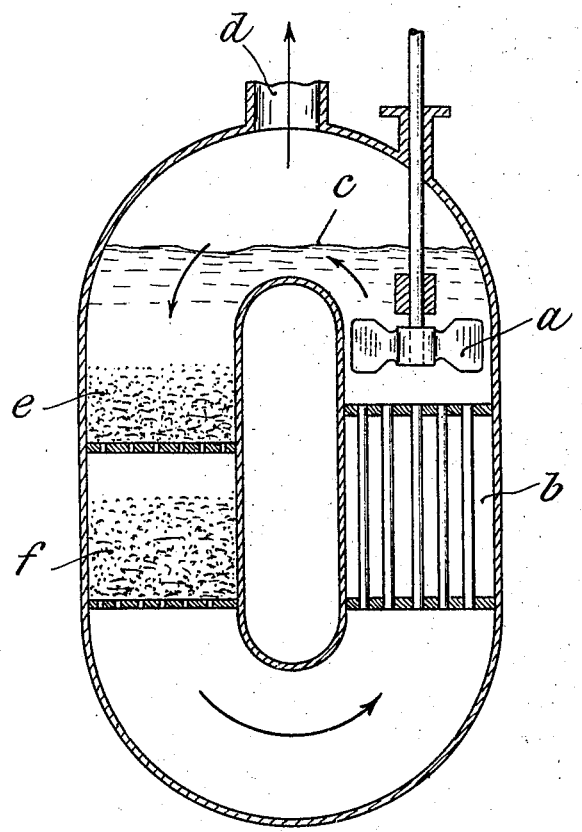

Patented Oct. 25, 1927.

1,646,454

UNITED STATES PATENT OFFICE.

ISAK ISAACHSEN, OF CHRISTIANIA, NORWAY, ASSIGNOR, BY MESNE ASSIGNMENTS, TO A./S. KRYSTAL, OF CHRISTIANIA, NORWAY.

METHOD OF SEPARATING TWO OR MORE SUBSTANCES FROM A SOLUTION.

Application filed February 26, 1923, Serial No. 621,418, and in Norway March 29, 1922.

This invention relates to a process for the precipitation of solid substances from solutions thereof and has for one of its objects a method whereby a plurality of substances in the same solution may be precipitated separately.

Heretofore substances have been precipitated from solutions thereof by alternately supersaturating a solution containing one or more substances and passing the supersaturated solution into contact with a collection of granules of the substance to be precipitated. In this way a part of the substance in the solution which is the same as that of the granules crystallizes upon the granules, causing them to grow, but when the solution under treatment is or becomes supersaturated also with a substance or substances other than that of which the collection of granules consists, a part of these other substances precipitates in a finely divided condition, thus contaminating the collection of granules.

It is known that two crystals of different substances are able to grow simultaneously in a solution of the said two substances (see Mellor: "Inorganic and Theoretical Chemistry" 1 (1922) 452, lines 3—4). The application of this principle in industry however involves great difficulties when substances are to be separated from one another on a large scale in an intensive and inexpensive operation, i. e. on a manufacturing scale. For example, if attempts are made to separate NaCl from KCl by evaporation of a solution saturated in respect of both substances by the use of the same method as is commonly employed in vacuum apparatus in the manufacture of common salt, the result would be only a fine granular mixture of NaCl and KCl. The potash salt manufacturers have, therefore, not been able to separate these two salts by aid of this method, but are still operating according to the old method of fractional crystallization. The same is the case, for instance, when a brine saturated with common salt and gypsum is evaporated in vacuum pans for the production of common salt. There is obtained a mixture of fine granular common salt and gypsum which is of lower value than if said substances had been obtained separately. In addition there results the injurious effect of the gypsum by its deposition upon the heating surfaces.

A further object of the invention therefore is to provide a process whereby each of several substances in a solution may be precipitated, each in the form of coarse granules.

Recently a crystallization process (U. S. Patent No. 1,478,337) invented by me, has become known, and this process renders it possible to effect intensive precipitation of solid substances in a coarse granular form. The application of this process to solve the exceedingly important problem of separating on a manufacturing scale two or more substances from one another in a coarsely granular form has hitherto not been suggested.

Only by means of the herein described combination of this process with the simultaneous precipitation of several substances (indicated in Mellor's work) can this problem be solved. By "spacing apart" the place where the supersaturation is effected and the place where it is released, it is made possible to dispose sufficiently large collections of crystals to prevent formation of new small crystals, which is an absolutely necessary condition in the case of intensive separation of several substances.

In accordance with my invention a solution which is saturated or supersaturated with two or more substances is treated alternately to produce supersaturation or to increase its supersaturation, and then passed through collections of granules of the several substances to be precipitated. In this way a part of each of the substances with which the solution is supersaturated is precipitated separately upon the granules of the same substance.

The process may be carried into effect either by forcing the solution upwardly through a suspension or suspensions of the granules or by passing the solution through a collection or collections of granules held in place by solid bodies, for instance, metal gauze. In case the granules are supported by solid bodies, rather than by the lifting action of an upwardly flowing current of the solution, the solution may be passed in any suitable direction through the granules.

The process may be carried out in a unitary apparatus or in apparatus comprising a plurality of units in each of which a separate collection of granules is maintained.

The granules of the substances to be precipitated may be arranged either as separate collections of granules of the different substances so that the solution passes in contact with the collections one after another or the granules of all of the several substances to be precipitated may be mixed together forming a single collection. In the latter case when the granules have been grown to the desired size, the granules of the different substances may be separated by known methods. For instance, if the granules of the different substances have different specific gravities, the so-called gravity separation methods may be used, or if the granules of the different substances are of different sizes they may be separated by a simple sifting. In order to produce granules of different sizes separable by sifting, seed granules of different sizes of the several substances to be precipitated may be used in making up the collection of granules.

The process can be applied upon all dissolved substances which are more readily precipitated upon granules of the same substance than upon granules of other substances.

Any suitable method may be used for producing supersaturation in the solution under treatment. For instance, supersaturation may be produced solely by evaporation of the solvent or by cooling a solution which has been brought to the point of saturation or nearly so by evaporation.

The accompanying drawing illustrates one form of apparatus suitable for the carrying out of the process of my invention. The apparatus illustrated is designed for the treatment of solutions from which only two substances are to be precipitated upon separate collections of granules thereof.

Referring to the drawing, $a$ is a propeller by means of which the solution is caused to flow successively through the superheater $b$, a collection $e$ of granules, for instance of NaCl, a collection $f$ of granules for instance of KCl, and back to the superheater. $c$ designates the surface of the solution from which evaporation takes place, the vapor passing out of the apparatus through the outlet $d$.

As regards the applicability of the process above described, it is to be noted that it is possible by means of same to separate even compounds which are as nearly related to one another as NaCl and KCl, which in Mellor's "Inorganic Chemistry" are stated to be isomorphous. It is not possible, however, to separate the substances when they form double salts under the conditions at which the crystallization takes place.

I claim:—

1. A process of separating a plurality of substances in coarse granular form from solution, comprising the steps of supersaturating the solution with more than one substance, causing the solution thereafter to flow into and through collections of granules of more than one of said substances, each granule of said collections consisting of only one of said substances, and maintaining said collections of substances apart from the place wherein supersaturation with said substances is effected.

2. A process according to claim 1 in which the solution supersaturated with respect to a plurality of substances is caused to flow into and through a mixture of granules of said substances until said granules have grown to the desired size.

3. A process according to claim 1 in which the solution supersaturated with respect to a plurality of substances is caused to flow into and through a mixture of granules of said substances until said substances have grown to the desired size and thereafter separating the granules of each of said substances from the granules of each other of said substances.

In testimony that I claim the foregoing as my invention, I have signed my name.

ISAK ISAACHSEN.